United States Patent
Morita et al.

(10) Patent No.: US 10,169,350 B2
(45) Date of Patent: Jan. 1, 2019

(54) INFORMATION PROCESSOR, NON-TRANSITORY COMPUTER READABLE MEDIUM, AND INFORMATION PROCESSING METHOD

(71) Applicant: FUJI XEROX CO., LTD., Tokyo (JP)

(72) Inventors: Yusuke Morita, Kanagawa (JP); Tatsuo Fukushima, Kanagawa (JP); Satoshi Kawamura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 653 days.

(21) Appl. No.: 14/528,328

(22) Filed: Oct. 30, 2014

(65) Prior Publication Data

US 2015/0331904 A1  Nov. 19, 2015

(30) Foreign Application Priority Data

May 19, 2014 (JP) .................................. 2014-103451

(51) Int. Cl.
*G06F 7/00* (2006.01)
*G06F 17/30* (2006.01)

(52) U.S. Cl.
CPC .... *G06F 17/30091* (2013.01); *G06F 17/3007* (2013.01); *G06F 17/30011* (2013.01); *G06F 17/30345* (2013.01); *G06F 17/30424* (2013.01)

(58) Field of Classification Search
CPC ......... G06F 17/30424; G06F 17/30011; G06F 17/3007; G06F 17/30345
(Continued)

(56) References Cited

U.S. PATENT DOCUMENTS 5,805,118 A * 9/1998 Mishra ................... G06F 3/1423
                                                         345/1.1
6,571,054 B1 * 5/2003 Tonomura ............. G06F 3/0483
                                                         386/241
(Continued)

FOREIGN PATENT DOCUMENTS

JP    2006-244467 A    9/2006
JP    2008-026995      2/2008
(Continued)

OTHER PUBLICATIONS

Dec. 12, 2017 Office Action issued in Japanese Application No. 2014-103451.

(Continued)

*Primary Examiner* — Binh V Ho
(74) *Attorney, Agent, or Firm* — Oliff PLC

(57) ABSTRACT

An information processor includes a dividing part and a providing part. The dividing part divides a series of data pieces identified by an identification information piece into multiple data pieces identified by respective different identification information pieces. The providing part provides, based on the number of digits of a total number of the multiple data pieces, each of the multiple data pieces resulting from the division by the dividing part with a corresponding one of the identification information pieces, the corresponding one identification information piece including a code having digits the number of which is equal to or larger than the number of digits of the total number of the multiple data pieces and indicating an order of placement of the data piece in the series of data pieces.

11 Claims, 6 Drawing Sheets

(58) Field of Classification Search
USPC .......................................................... 707/755
See application file for complete search history.

(56) References Cited

U.S. PATENT DOCUMENTS

| | | | | |
|---|---|---|---|---|
| 7,210,102 | B1* | 4/2007 | Gordon | G06K 9/00442 715/253 |
| 7,574,649 | B1* | 8/2009 | Safars | G06F 17/30899 715/200 |
| 2003/0056174 | A1* | 3/2003 | Nara | G06F 17/217 715/255 |
| 2003/0067940 | A1* | 4/2003 | Edholm | H04L 47/10 370/468 |
| 2003/0070146 | A1* | 4/2003 | Sato | G06F 17/211 715/251 |
| 2003/0236864 | A1* | 12/2003 | Lai | H04L 29/06 709/219 |
| 2005/0012950 | A1* | 1/2005 | Kurashina | B41J 3/4075 358/1.12 |
| 2005/0206947 | A1* | 9/2005 | Kitahara | G06F 3/1205 358/1.15 |
| 2007/0022131 | A1* | 1/2007 | Duncan | G06F 17/218 |
| 2007/0087316 | A1* | 4/2007 | Arnold | G06Q 10/00 434/317 |
| 2007/0118556 | A1* | 5/2007 | Arnold | G06F 17/211 |
| 2008/0123123 | A1 | 5/2008 | Kawaharada | |
| 2009/0276693 | A1* | 11/2009 | Miyamoto | G06F 17/2745 715/234 |
| 2010/0106721 | A1* | 4/2010 | Mori | G06F 17/30011 707/736 |
| 2011/0217022 | A1* | 9/2011 | Miller | G06Q 30/02 386/278 |
| 2011/0245649 | A1* | 10/2011 | Luce | A61B 3/0025 600/401 |
| 2012/0303412 | A1* | 11/2012 | Etzioni | G06Q 30/06 705/7.31 |
| 2013/0139052 | A1* | 5/2013 | Rong | G06F 17/217 715/251 |
| 2013/0185108 | A1* | 7/2013 | Bainbridge | G06Q 10/10 705/7.15 |
| 2013/0185198 | A1* | 7/2013 | Lorch | G06Q 20/29 705/39 |
| 2013/0342867 | A1* | 12/2013 | Akahira | G06K 15/02 358/1.15 |
| 2017/0010773 | A1* | 1/2017 | Curcelli | G06F 3/0483 |

FOREIGN PATENT DOCUMENTS

| | | |
|---|---|---|
| JP | 2008-134721 | 6/2008 |
| JP | 2008-158898 | 7/2008 |
| JP | 2010-237748 A | 10/2010 |
| JP | 2011-181112 A | 9/2011 |
| JP | 2014-63226 A | 4/2014 |

OTHER PUBLICATIONS

Apr. 23, 2018 Office Action issued in Chinese Application No. 201410742660.7.

* cited by examiner

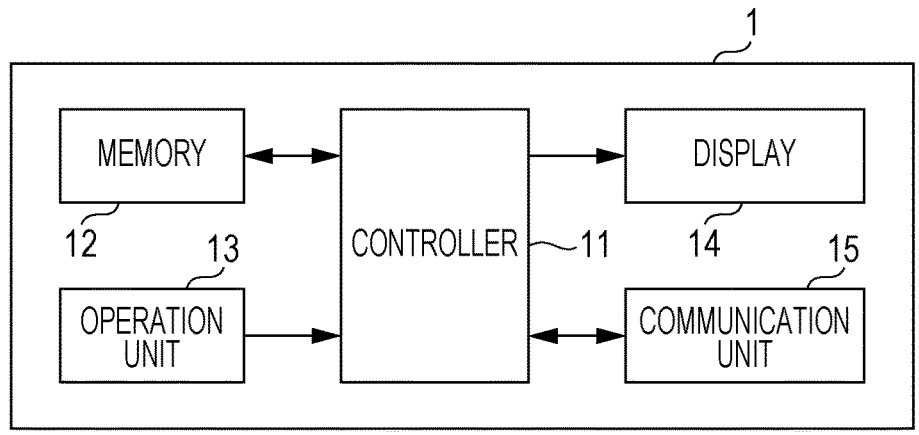

FIG. 7A

| FILE NAME △ | SIZE |
|---|---|
| 100page.001.xdw | xxx kbytes |
| 100page.002.xdw | xxx kbytes |
| 100page.003.xdw | xxx kbytes |
| ... | ... |
| ... | ... |
| 100page.050.xdw | xxx kbytes |
| ... | ... |
| ... | ... |
| 100page.100.xdw | xxx kbytes |

FIG. 7B

| FILE NAME ▽ | SIZE |
|---|---|
| 100page.100.xdw | xxx kbytes |
| 100page.099.xdw | xxx kbytes |
| 100page.098.xdw | xxx kbytes |
| ... | ... |
| ... | ... |
| 100page.050.xdw | xxx kbytes |
| ... | ... |
| ... | ... |
| 100page.001.xdw | xxx kbytes |

FIG. 8A
RELATED ART

| FILE NAME △ | SIZE |
|---|---|
| 100page.1.xdw | xxx kbytes |
| 100page.10.xdw | xxx kbytes |
| 100page.11.xdw | xxx kbytes |
| ... | ... |
| 100page.2.xdw | xxx kbytes |
| 100page.21.xdw | xxx kbytes |
| ... | ... |
| ... | ... |
| 100page.99.xdw | xxx kbytes |

FIG. 8B
RELATED ART

| FILE NAME ▽ | SIZE |
|---|---|
| 100page.99.xdw | xxx kbytes |
| 100page.98.xdw | xxx kbytes |
| ... | ... |
| 100page.9.xdw | xxx kbytes |
| 100page.89.xdw | xxx kbytes |
| ... | ... |
| ... | ... |
| 100page.10.xdw | xxx kbytes |
| 100page.1.xdw | xxx kbytes |

INFORMATION PROCESSOR, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2014-103451 filed May 19, 2014.

BACKGROUND (i) Technical Field

The present invention relates to an information processor, a non-transitory computer readable medium, and an information processing method.

(ii) Related Art

To date, several techniques for dividing a document file into multiple document files have been proposed.

SUMMARY

According to an aspect of the invention, there is provided an information processor including a dividing part and a providing part. The dividing part divides a series of data pieces identified by an identification information piece into multiple data pieces identified by respective different identification information pieces. The providing part provides, based on the number of digits of a total number of the multiple data pieces, each of the multiple data pieces resulting from the division by the dividing part with a corresponding one of the identification information pieces, the corresponding one identification information piece including a code having digits the number of which is equal to or larger than the number of digits of the total number of the multiple data pieces and indicating an order of placement of the data piece in the series of data pieces.

BRIEF DESCRIPTION OF THE DRAWINGS

An exemplary embodiment of the present invention will be described in detail based on the following figures, wherein:

FIG. 1 is a block diagram illustrating an example of a hardware configuration of an information processor;

FIGS. 2A and 2B are tables each illustrating an example of a configuration of a file stored in a memory;

FIGS. 7A and 7B are tables each illustrating an example of a screen displayed on a display; and FIGS. 8A and 8B are tables each illustrating an example of a screen displayed on the display.

DETAILED DESCRIPTION

Figure 3:
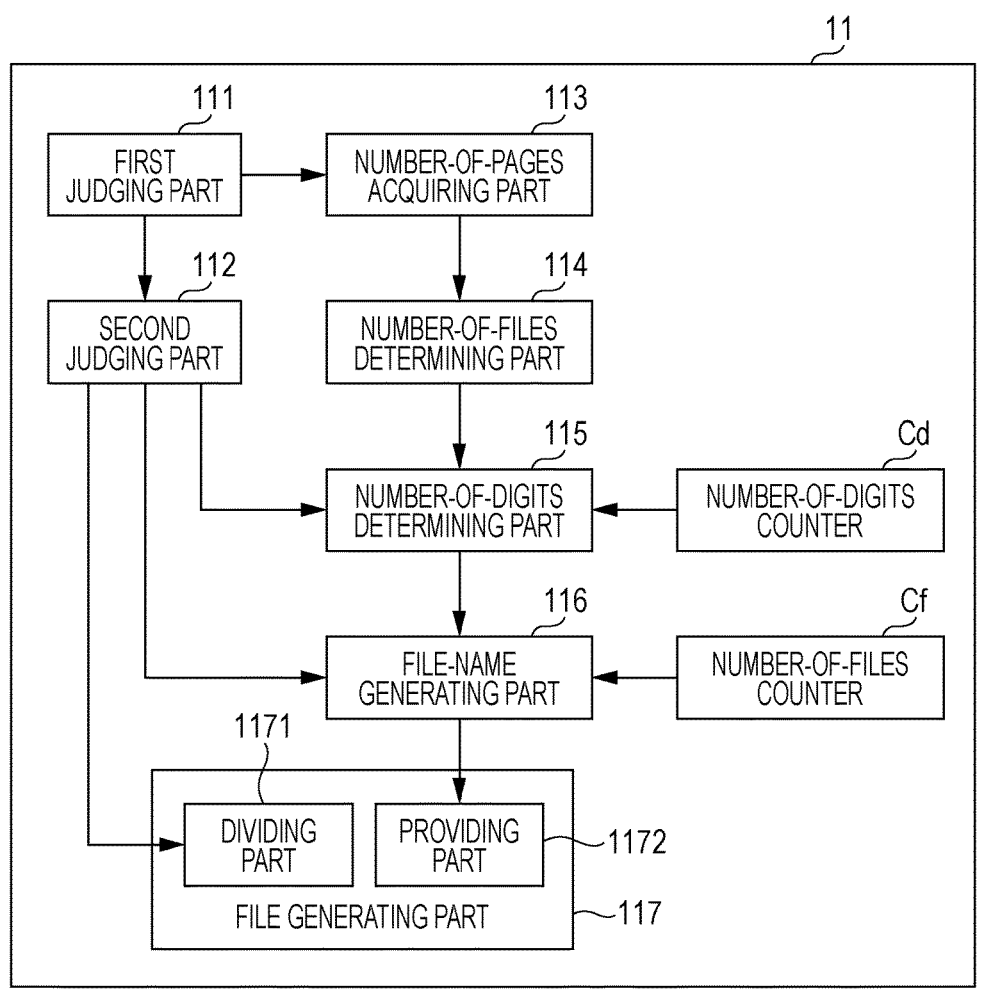
FIG. 3 is a block diagram illustrating a configuration example of a group of functions implemented by a controller.

Hereinafter, an exemplary embodiment of the present invention will be described with reference to the drawings.

1. Exemplary Embodiment 1-1. Configuration

FIG. 1 is a block diagram illustrating an example of a hardware configuration of an information processor 1 according to an exemplary embodiment of the present invention. The information processor 1 is, for example, a personal computer, and more specifically, is a mobile terminal such as a smartphone or a tablet terminal, or a desktop computer. The information processor 1 includes a controller 11, a memory 12, an operation unit 13, a display 14, and a communication unit 15, as illustrated in FIG. 1.

The controller 11 includes, for example, a central processing unit (CPU), a read only memory (ROM), and a random access memory (RAM). The CPU loads a program into the RAM from the ROM or the memory 12 and executes the program. The memory 12 is, for example, a storage device such as a hard disk drive (HDD) or a flash memory. The memory 12 may be a storage device attachable to and detachable from the information processor 1, like a memory card. The memory 12 stores therein various files. Note that a file is an example of a "series of data pieces" and "data" according to the exemplary embodiment of the present invention.

FIGS. 2A and 2B are tables each illustrating an example of a configuration of a file stored in the memory 12. FIG. 2A is a table illustrating an example of a configuration of a file using pages as data units. Examples of the file include a document file. FIG. 2B is a table illustrating an example of a configuration of a file not using pages as data units. Examples of the file include a hypertext markup language (HTML) file.

The file in FIG. 2A is configured in such a manner that management information and page information are associated with each other. The management information is information for managing pages of the file, and specifically is configured in such a manner that file-name information, page-ID list information, and total-number-of-pages information are associated with one another. A file name is identification information of the file, a page-ID list is a list in which page IDs of the pages of the file are registered, and the total number of pages is the total number of pages of the file. The total-number-of-pages information is generated when the file is generated and is updated when the file is updated. In contrast, the page information includes real data expressing each page, and specifically, is configured in such a manner that each page ID and a corresponding page data piece are associated with each other. The page ID is identification information of each page, and the page data is real data expressing the page.

The file in FIG. 2B has a file name and file data that are associated with each other. The file name is identification information of the file, and the file data is real data expressing the file.

The operation unit 13 is a device such as a touch sensor, a keyboard, or a mouse. The operation unit 13 receives, for example, an operation by a user for selecting a file to be divided and an operation for giving an instruction for executing file dividing processing to be described later. The display 14 is a display device such as a liquid crystal display, and displays, for example, icons of files stored in the memory 12. The communication unit 15 is, for example, a communication interface such as a network card, and performs data communications with an external device through a communication network.

FIG. 3 is a block diagram illustrating a configuration example of a group of functions implemented by the controller 11. The controller 11 executes the program stored in the ROM or the memory 12 to thereby implement the functional group composed of a first judging part 111, a second judging part 112, a number-of-pages acquiring part 113, a number-of-files determining part 114, a number-of-digits determining part 115, a file-name generating part 116, a file generating part 117, a number-of-files counter Cf, and a number-of-digits counter Cd.

The first judging part 111 judges whether a file to be divided has total-number-of-pages information. The second judging part 112 judges whether the to-be-divided file is a file using pages as data units.

The number-of-pages acquiring part 113 acquires the total-number-of-pages information of the to-be-divided file. Specifically, if the first judging part 111 makes an affirmative judgment, the number-of-pages acquiring part 113 acquires the total-number-of-pages information held by the to-be-divided file. If the first judging part 111 makes a negative judgment, and if the second judging part 112 makes an affirmative judgment, the number-of-pages acquiring part 113 analyzes the to-be-divided file to acquire the total-number-of-pages information.

If each of the first judging part 111 and the second judging part 112 makes a negative judgment (for example, if the to-be-divided file is not document data representing a document having multiple pages), the number-of-pages acquiring part 113 acquires the total-number-of-pages information on the basis of the to-be-divided file. Specifically, the number-of-pages acquiring part 113 acquires the total-number-of-pages information by counting new files generated in the course of the file dividing processing to be described later.

The number-of-files determining part 114 determines the total number of new files in a group that are generated after the to-be-divided file is divided. Specifically, the number-of-files determining part 114 determines the total number of files in such a manner that the total number of pages indicated by the total-number-of-pages information acquired by the number-of-pages acquiring part 113 is divided by a division unit (that is, the number of pages to be included in each file) designated by the user.

The number-of-digits determining part 115 determines the number of file-number digits to be included in file names of the new files. Specifically, if the second judging part 112 makes an affirmative judgment, the number-of-digits determining part 115 determines the number of file-number digits on the basis of the total number of new files that is determined by the number-of-files determining part 114. If the second judging part 112 makes a negative judgment, the number-of-digits determining part 115 reads a value of the number-of-digits counter Cd and specifies the value as the number of file-number digits.

The file-name generating part 116 generates the file names of the new files. Specifically, if the second judging part 112 makes an affirmative judgment, the file-name generating part 116 generates each file name in such a manner as to add the file No. of the corresponding new file (specifically, a value in a range from "1" to the total number of new files) to the file name of the to-be-divided file, the file No. being described on the basis of the number of digits determined by the number-of-digits determining part 115. If the second judging part 112 makes a negative judgment, the file-name generating part 116 generates the file name in such a manner as to add the file No. to the file name of the to-be-divided file, the file No. indicating a value of the number-of-files counter Cf and being described on the basis of the number of digits determined by the number-of-digits determining part 115. Note that the file No. is an example of a "code" according to the exemplary embodiment of the present invention.

The file generating part 117 generates the new files. The file generating part 117 includes a dividing part 1171 and a providing part 1172.

The dividing part 1171 divides a file identified by a piece of identification information into files identified by respective different pieces of identification information. Specifically, if the second judging part 112 makes an affirmative judgment, the dividing part 1171 deletes a page ID of a page to be separated, from the page-ID list of the to-be-divided file, generates management information for each new file, and adds the deleted page ID to the page-ID list in the management information. If the second judging part 112 makes a negative judgment, the dividing part 1171 deletes file data corresponding to the division unit designated by the user, from the to-be-divided file. The dividing part 1171 also generates management information for the new file and associates the management information with the deleted data.

In accordance with the number of digits of the total number of files resulting from the division by the dividing part 1171, the providing part 1172 provides each of the files with a file name including a file No. that has digits the number of which is equal to the number of digits of the total number of files and that indicates an order of placement of the corresponding data piece in the to-be-divided file. At this time, the providing part 1172 provides the new file with the corresponding file name generated by the file-name generating part 116.

1-2. Operation

Next, operation of the information processor 1 will be described. Specifically, a description is given of the file dividing processing of dividing one file into multiple files.

Figure 4:
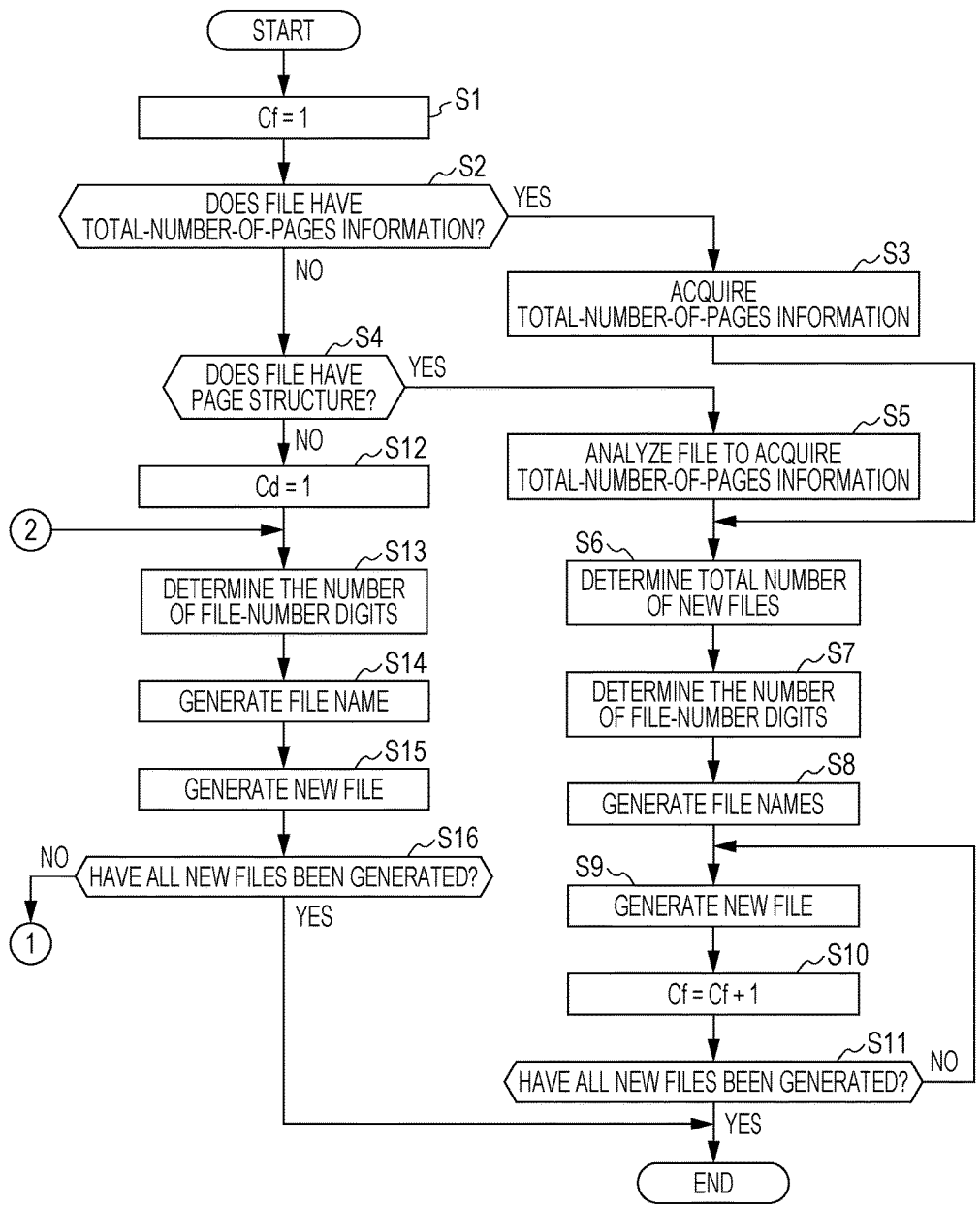
FIG. 4 is a flowchart illustrating an example of file dividing processing.
Figures 5, 6:
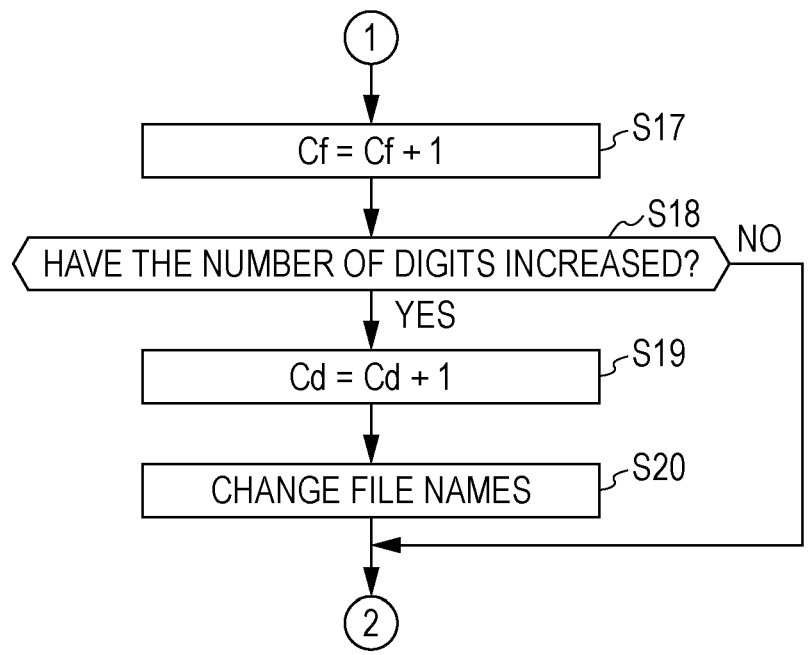
FIG. 5 is a flowchart illustrating the example of the file dividing processing.
FIG. 6 is a table illustrating an example of a list of file names.

FIGS. 4 and 5 are flowcharts illustrating an example of the file dividing processing. The file dividing processing illustrated in FIGS. 4 and 5 is executed when the user selects a to-be-divided file and designates division of the file. The user also designates a division unit when designating the file division or in advance.

In step S1, the number-of-files counter Cf is initialized to have a value "1".

The first judging part 111 then judges whether a to-be-divided file has total-number-of-pages information (step S2). If it is judged that the to-be-divided file has the total-number-of-pages information (step S2: YES), the number-of-pages acquiring part 113 acquires the total-number-of-pages information (step S3). Thereafter, the processing proceeds to step S6. On the other hand, if it is judged that the to-be-divided file does not have the total-number-of-pages information (step S2: NO), the second judging part 112 judges whether the to-be-divided file is a file using pages as data units (step S4).

If it is judged in step S4 that the to-be-divided file is a file using pages as data units (step S4: YES), the number-of-pages acquiring part 113 analyzes the to-be-divided file to acquire the total-number-of-pages information (step S5). For example, the number-of-pages acquiring part 113 counts page IDs registered in the page-ID list of the to-be-divided file to acquire the total-number-of-pages information. On the other hand, if it is judged in step S4 that the to-be-divided file is not a file using pages as data units (step S4: NO), the number-of-digits counter Cd is initialized to have the value "1" (step S12).

Hereinafter, a description is given of processing from step S6 to step S11, i.e., subsequent to step S5.

In step S6, the number-of-files determining part 114 determines the total number of new files to be generated after the to-be-divided file is divided. Specifically, the number-of-files determining part 114 determines the total number of new files by dividing the total number of pages by a number designated as the division unit by the user, the total number of pages being indicated by the total-number-of-pages information acquired in step S3 or step S5. For example, in a case where the total number of pages indicated by the total-number-of-pages information is "100" and where the division unit designated by the user is "1", the number-of-files determining part 114 specifies "100" as the total number of new files.

The number-of-digits determining part 115 determines the number of digits of the file number to be included in each file name of the corresponding new file (step S7). Specifically, the number-of-digits determining part 115 determines the number of file-number digits on the basis of the total number of new files that is determined by the number-of-files determining part 114 in step S6. For example, if the total number of new files determined by the number-of-files determining part 114 in step S6 is "100", the number-of-digits determining part 115 specifies "3" as the number of file-number digits.

The file-name generating part 116 generates the file names of the new files (step S8). Specifically, the file-name generating part 116 generates each file name in such a manner that a file No. (specifically, a value in the range from the value "1" to the total number of new files) described on the basis of the number of digits determined by the number-of-digits determining part 115 is added to the file name of the to-be-divided file. For example, assume a case where the file name of the to-be-divided file is "file.xdw", where the number-of-files determining part 114 determines the total number of new files as "100" in step S6, and where the number-of-digits determining part 115 determines the number of digits as "3" in step S7. In this case, the file-name generating part 116 generates, for example, "file.001.xdw" as the file name of the first file.

FIG. 6 is a table illustrating an example of a list L of the file names generated in the RAM in step S8. As illustrated in FIG. 6, the list L stores therein the file names associated with respective values from "1" to the total number of new files (a value "100" in this example).

Note that the file No. "001" is inserted between a character string "file" and an extension "xdw" in this example, but the file No. insertion position is not limited to the example. For example, the file No. may be inserted at a position before the character string "file". The character string "file" and the extension "xdw" included in the file name of the original file are used without being changed for the file names of the new files in this example, but may be deleted or changed for the new files. The above holds true for file names generated in step S14 to be described later.

The file generating part 117 generates one of the new files (step S9). Specifically, the dividing part 1171 firstly deletes a page ID of a page to be separated, from the page-ID list of the to-be-divided file; generates management information of the new file; and adds the deleted page ID to the page-ID list in the management information. Note that the dividing part 1171 deletes the page ID from the page-ID list, for example, in ascending order. Then, the providing part 1172 reads the value of the number-of-files counter Cf and provides the new file with the file name associated with the read value in the list L in the RAM. For example, if "1" is read as the value of the number-of-files counter Cf from the list L in FIG. 6 stored in the RAM, the providing part 1172 provides the new file with a file name "file.001.xdw" associated with the number "1" in the list L.

Upon generation of the new files, the value of the number-of-files counter Cf is incremented by "1" (step S10). Then, it is judged whether the value of the number-of-files counter Cf has exceeded the total number of new files. In other words, it is judged whether all of the new files have been generated (step S11).

If it is judged that the value of the number-of-files counter Cf has exceeded the total number of new files, that is, if generation of all the new files has been completed (step S11: YES), the file dividing processing is terminated. On the other hand, if it is judged that the value of the number-of-files counter Cf has not exceeded the total number of new files, that is, if generation of all the new files has not been completed (step S11: NO), the processing moves back to step S9.

Next, a description is given of processing from step S13 to step S20, i.e., subsequent to step S12.

In step S13, the number-of-digits determining part 115 determines the number of file-number digits of the file names to be included in the new files. Specifically, the number-of-digits determining part 115 reads a value of the number-of-digits counter Cd and specifies the value as the number of file-number digits. For example, in a case where the number-of-digits counter Cd takes on the value "1", the number-of-digits determining part 115 specifies "1" as the number of file-number digits.

The file-name generating part 116 generates a file name of one of the new files to be generated (step S14). Specifically, the file-name generating part 116 generates the file name in such a manner that the file No. is added to the file name of the to-be-divided file, the file No. being described on the basis of the number of digits determined by the number-of-digits determining part 115 in step S13 and indicating the value of the number-of-files counter Cf. For example, assume a case where the file name of the to-be-divided file is "file.xdw", where the number-of-digits determining part 115 determines the number of digits as "3" in step S13, and where the number-of-files counter Cf takes on the value "1". In this case, the file-name generating part 116 generates "file.001.xdw" as the file name.

The file generating part 117 generates the new file (step S15). Specifically, the dividing part 1171 firstly deletes file data corresponding to the division unit designated by the user, from the to-be-divided file. For example, from the to-be-divided file, the dividing part 1171 deletes data corresponding to one or more pages the number of which is designated by the user and the size of which (for example, size A4) is designated in advance. Then, the new file is generated in such a manner that the providing part 1172 associates, with the deleted data, the file name generated by the file-name generating part 116 in immediately preceding step S14.

Upon generation of the new file, it is then judged whether all the data of the to-be-divided file has been deleted. In other words, it is judged whether all the new files have been generated (step S16).

If it is judged that all the file data has been deleted from the to-be-divided file, that is, if generation of all the new files has been completed (step S16: YES), the file dividing processing is terminated. On the other hand, if it is judged that all the file data has not been deleted from the to-be-divided file, that is, if generation of all the new files has not been completed (step S16: NO), the value of the number-of-files counter Cf is incremented by "1" (step S17). Then, it is judged whether the number of digits of the value of the number-of-files counter Cf has increased (step S18).

If it is judged that the number of digits has not increased (step S18: NO), the processing moves back to step S13. On the other hand, if it is judged that the number of digits increases (step S18: YES), the value of the number-of-digits counter Cd is incremented by "1" (step S19).

As a result of the increase of the number of digits, the providing part 1172 of the file generating part 117 changes the file name of each already generated new file (step S20). Specifically, the providing part 1172 changes the number of file-number digits in the file name of the generated new file to the number of digits that is equal to the value of the number-of-digits counter Cd. For example, in a case where the file name of the generated new file is "file.1.xdw" and where the number-of-digits counter Cd takes on a value "2", the providing part 1172 changes the file name to "file.01.xdw". Thereafter, the processing moves back to step S13.

The description of the file dividing processing has heretofore been given.

In a case where a file is divided into multiple files, the aforementioned information processor 1 according to the exemplary embodiment provides each of the generated new files with a file name including a file No. described by using digits the number of which is equal to the number of digits of the total number of files. For example, in a case where a document file "5page.xdw" having five pages is divided into document files each having a single page, new files having file names "5page.1.xdw", "5page.2.xdw", . . . , and "5page.5.xdw" are generated.

In another example, in a case where a file "10page.xdw" is divided into document files each having a single page, new files having file names "10page.01.xdw", "10page.02.xdw", . . . , and "10page.10.xdw" are generated.

In still another example, in a case where a document file "100page.xdw" having 100 pages is divided into document files each having a single page, new files having file names "100page.001.xdw", "100page.002.xdw", . . . , "100page.010.xdw", . . . , and "100page.100.xdw" are generated. FIGS. 7A and 7B are tables each illustrating an example of a screen displayed when the new files generated in this case are sorted on the basis of the file name. FIG. 7A illustrates an example of a screen displayed when the new files are sorted in ascending order; and FIG. 7B, in descending order.

It is seen from FIGS. 7A and 7B that the new files are sorted in order of file No., regardless of whether the file names are arranged in ascending or descending order of file names.

In contrast, FIGS. 8A and 8B are tables each illustrating an example of a screen displayed when new files generated by using a conventional file-naming method are sorted on the basis of the file name. FIG. 8A is a table illustrating an example of a screen displayed when the new files are sorted on the basis of the file name in ascending order; and FIG. 8B, in descending order.

FIG. 8A illustrates a file name "100page.1.xdw" followed by a file name "100page.10.xdw" and a file name "100page.11.xdw" followed by a file name "100page.2.xdw", and thus it is seen that the new files are not sorted in the order of the file No. when the files are sorted in the ascending order of the file names. This holds true for the case of sorting in descending order. FIG. 8B illustrates, for example, a file name "100page.9.xdw" followed by a file name "100page.98.xdw" and a file name "100page.10.xdw" immediately followed by a file name "100page.1.xdw".

Such a phenomenon occurs because the digits of the numbers included in the file names are compared with one another in order one by one from the top based on the character code.

2. Modifications

The exemplary embodiment described above may be modified as below. The following modifications may each be combined with one or more other modifications.

2-1. Modification 1

A file is divided in the file dividing processing according to the aforementioned exemplary embodiment, but a folder may be divided instead of a file.

2-2. Modification 2

A file not using pages as data units is exemplified by an HTML file in the aforementioned exemplary embodiment, but may be exemplified by other files such as an image file, a music file, and a video file. In a case where an image file or the like is divided, for example, data size may be designated as a division unit.

2-3. Modification 3

In the file dividing processing according to the aforementioned exemplary embodiment, each of newly generated files is provided with a file name including a file No. with digits the number of which is equal to the number of digits of the total number of newly generated files. However, the number of file-number digits included in the file name may be larger than the number of digits of the total number of newly generated files.

2-4. Modification 4

In the file dividing processing according to the aforementioned exemplary embodiment, each of newly generated files is provided with a file name in which a file No. is added to the file name of the original file. The decimal system is used to express the file No., but another number system may be used (for example, the hexadecimal number system). Alternatively, instead of the file No., another code indicating the order of the placement of the files and expressed in a digital format may be used. Examples of the code include the alphabet.

2-5. Modification 5

In the aforementioned exemplary embodiment or the modifications, the program executed by the controller 11 of the information processor 1 may be provided in a state of being stored in a storage medium such as a magnetic tape, a magnetic disk, a flexible disk, an optical disk, a magneto-optical disk, or a memory. The program may also be downloaded through a communication network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processor comprising a central processing unit and associated memory configured to function as:
   a dividing part that divides a series of data pieces identified by an identification information piece into a plurality of data pieces; and
   a providing part that provides, based on the number of digits of a total number of the plurality of data pieces resulting from the division by the dividing part, each of the plurality of data pieces with a corresponding, different identification information piece, the corresponding identification information piece including a code having digits the number of which is equal to or larger than the number of digits of the total number of the plurality of data pieces and indicating an order of placement of the data piece in the series of data pieces,
   wherein for at least one of the plurality of data pieces whose order of placement is a number having less than the number of digits of the total number of the plurality of data pieces, the code of the corresponding identification information piece provided by the providing part has digits the number of which is equal to or larger than the number of digits of the total number of the plurality of data pieces, and
   wherein in response to an increase in the number of digits of the total number of the plurality of data pieces, the providing part changes the code of the corresponding identification information piece of each of the plurality of data pieces to have digits the number of which is equal to the increased number of digits of the total number of the plurality of data pieces.

2. The information processor according to claim 1, wherein
   the code has digits the number of which is equal to the number of digits of the total number of the plurality of data pieces.

3. The information processor according to claim 1, wherein
   in a case where the series of data pieces is document data representing a document having a plurality of pages, the code has digits the number of which is equal to the number of digits of a total number of the plurality of pages in the document data.

4. The information processor according to claim 3, wherein
   in a case where the document data is associated with total-number-of-pages information indicating the total number of the plurality of pages, the code has digits the number of which is equal to the number of digits of the total number indicated by the total-number-of-pages information.

5. The information processor according to claim 1, wherein the central processing unit and the associated memory are configured to function as:
   an acquiring part that acquires, based on the series of data pieces, total-number-of-data-pieces information indicating the total number of the plurality of data pieces,
   in a case where the series of data pieces is not document data representing a document having a plurality of pages, wherein
   the code has digits the number of which is equal to the number of digits of the total number indicated by the total-number-of-data-pieces information acquired by the acquiring part.

6. A non-transitory computer readable medium storing a program causing a computer to execute a process for processing information, the process comprising:
   dividing a series of data pieces identified by an identification information piece into a plurality of data pieces; and
   providing, based on the number of digits of a total number of the plurality of data pieces resulting from the division, each of the plurality of data pieces with a corresponding, different identification information piece, the corresponding identification information piece including a code having digits the number of which is equal to or larger than the number of digits of the total number of the plurality of data pieces and indicating an order of placement of the data piece in the series of data pieces,
   wherein for at least one of the plurality of data pieces whose order of placement is a number having less than the number of digits of the total number of the plurality of data pieces, the code of the corresponding identification information piece has digits the number of which is equal to or larger than the number of digits of the total number of the plurality of data pieces, and
   wherein in response to an increase in the number of digits of the total number of the plurality of data pieces, the code of the corresponding identification information piece of each of the plurality of data pieces is changed to have digits the number of which is equal to the increased number of digits of the total number of the plurality of data pieces.

7. The non-transitory computer readable medium according to claim 6, wherein
   the code has digits the number of which is equal to the number of digits of the total number of the plurality of data pieces.

8. The non-transitory computer readable medium according to claim 6, wherein
   in a case where the series of data pieces is document data representing a document having a plurality of pages, the code has digits the number of which is equal to the number of digits of a total number of the plurality of pages in the document data.

9. The non-transitory computer readable medium according to claim 8, wherein
   in a case where the document data is associated with total-number-of-pages information indicating the total number of the plurality of pages, the code has digits the number of which is equal to the number of digits of the total number indicated by the total-number-of-pages information.

10. The non-transitory computer readable medium according to claim 6, the process further comprising:
    acquiring, based on the series of data pieces, total-number-of-data-pieces information indicating the total number of the plurality of data pieces, in a case where the series of data pieces is not document data representing a document having a plurality of pages, wherein the code has digits the number of which is equal to the number of digits of the total number indicated by the acquired total-number-of-data-pieces.

11. An information processing method comprising:

dividing a series of data pieces identified by an identification information piece into a plurality of data pieces; and providing, based on the number of digits of a total number of the plurality of data pieces resulting from the division, each of the plurality of data pieces with a corresponding, different identification information piece, the corresponding identification information piece including a code having digits the number of which is equal to or larger than the number of digits of the total number of the plurality of data pieces and indicating an order of placement of the data piece in the series of data pieces, wherein for at least one of the plurality of data pieces whose order of placement is a number having less than the number of digits of the total number of the plurality of data pieces, the code of the corresponding identification information piece has digits the number of which is equal to or larger than the number of digits of the total number of the plurality of data pieces, and wherein in response to an increase in the number of digits of the total number of the plurality of data pieces, the code of the corresponding identification information piece of each of the plurality of data pieces is changed to have digits the number of which is equal to the increased number of digits of the total number of the plurality of data pieces.

* * * * *